Dec. 17, 1968     G. MEHNERT     3,416,190

DIEHEAD

Filed June 28, 1966

INVENTOR:
GOTTFRIED MEHNERT
BY
Michael S. Striker
his ATTORNEY

United States Patent Office 3,416,190
Patented Dec. 17, 1968

3,416,190
DIEHEAD
Gottfried Mehnert, Lankwitzer Str. 14/15, Berlin-Mariendorf, Germany
Filed June 28, 1966, Ser. No. 561,098
20 Claims. (Cl. 18—14)

ABSTRACT OF THE DISCLOSURE

A plastic extrusion apparatus in which a torpedo-shaped core is arranged with clearance in the housing of the diehead to define between the outer surface of the core and the inner surface of the housing an annular passage through which plastic material under pressure may pass from the inlet to the outlet of the housing and in which a plurality of preferably equally spaced self-centering projections extends substantially radially outwardly from the core. The projections have outer faces abutting flush against portions of the inner surface of the housing which taper towards the outlet of the latter so that the pressure of the plastic material will press the outer faces of the projections against the inner surface portions to maintain the axial position of the core relative to the housing and to prevent any plastic material to penetrate between the outer faces and the inner surface portions to thus maintain perfect centering of the core.

---

Figure 1:
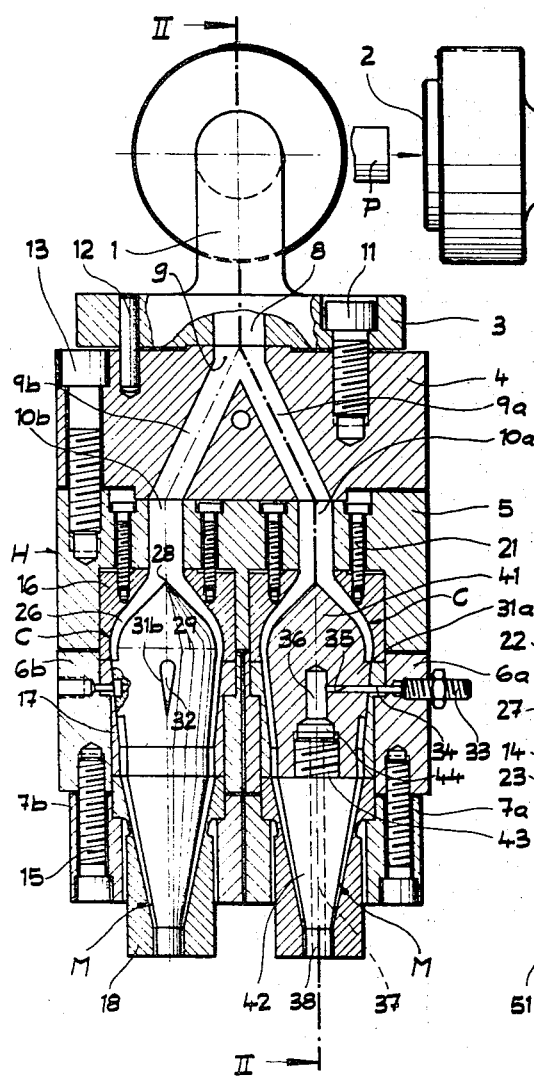

The present invention relates to machines for forming shaped articles of plastic material, particularly to so-called blow molding machines which can be used in the production of bottles and analogous hollow plastic articles. Still more particularly, the invention relates to an improved diehead which may be utilized in connection with the plasticizer of a blow molding machine to form preferably tubular parisons or blanks which are thereupon expanded in the blow mold. Such dieheads must furnish parisons whose material is still in deformable state so that the parisons may be subjected to further treatment.

The plastic material which issues from a plasticizer (for example, from a cylinder wherein granular material is heated and plasticized to issue in the form of a continuous stream) is often very sensitive, depending on its physical characteristics which in turn depend on the chemical composition of the starting material. Many plastic materials which are utilized in blow molding are very likely to change their physical characteristics on their way from the plasticizer, through a diehead, and into the cavity of a blow mold. The sensitivity of a plastic material is greater if the temperature range in which the material can be properly shaped in a blow mold is narrow. The physical characteristics of many plastic materials which are used in blow molding are likely to be adversely affected by pronounced changes in the direction of flow, by passage along dead corners which contain hardened batches of plastic material, by uncontrolled pileup of flowing material, and by many other factors. For example, hard polyvinyl chloride can be satisfactorily shaped in a blow mold within a very narrow temperature range of about 10° C. In other words, if the temperature of a stream of hard PVC rises by about 5° C. above an optimum median temperature, the material will burn whereas if the temperature drops by about 5° C. below such optimum median value, the material cannot be blow-molded because its plasticity decreases with resultant danger to the component parts of the machine through which the material flows on its way to the blow mold. Once the material is allowed to harden, it piles up in the diehead and the pressure of gas which is admitted into the blow mold cannot bring about expansion to form bottles or like hollow articles. The damage is even greater if a single diehead is used to form two or more parisons in a simultaneous operation because, once the paths for plastic material through the diehead are clogged, the machine must be brought to a standstill and the diehead must be replaced with a fresh diehead. In conventional multiple dieheads, the streams of plastic material which are to form two or more parisons at a time must travel through different distances whereby the pressure, speed, temperature and viscosity of the individual streams are different with resultant variations in the quality of ultimate products.

Accordingly, it is an important object of the present invention to provide a novel and improved diehead which may be used in blow molding and like plastic processing machines and to construct and assemble the diehead in such a way that the material flowing therethrough is not compelled to suddenly change the direction of its flow toward the outlet, that such material does not flow along a path which has dead corners or like areas likely to accumulate stagnant plastic material, and that the material can be conveyed at a constant rate.

Another object of the invention is to provide a diehead which is assembled in such a way that its components may be machined with utmost precision and by resorting to presently known machinery.

A further object of the instant invention is to provide a diehead for use in connection with plasticizers for blow molding and like machines and to assemble the parts of the diehead in such a way that the latter can produce a plurality of parisons in a simultaneous operation without in any way affecting the quality of such parisons.

An additional object of the invention is to provide a diehead which can be adjusted prior to or during actual use to regulate the wall thickness of successive parisons.

Still another object of the invention is to provide a novel housing and a novel mandrel for the improved diehead.

A concomitant object of the invention is to provide a very simple device which prevents angular displacement of the mandrel with reference to the housing of the diehead and to provide the diehead with very simple means for admitting so-called supporting gas into the interior of successively extruded parisons.

A further object of my invention is to provide a diehead which can be readily installed in existing blow molding and like plastic processing machines.

Briefly stated, one feature of my present invention resides in the provision of a diehead which may be utilized in a machine for forming shaped articles of plastic material, particularly in a blow molding machine wherein the diehead is utilized to discharge tubular parisons which are thereupon expanded by means of a gaseous fluid in the cavity of a suitable blow mold. The improved diehead comprises a composite housing provided with an inlet, an outlet which can be disposed coaxially with the inlet, and a passage connecting the inlet with the outlet and bounded by a specially configurated smooth internal surface of the housing. The diehead further comprises a special mandrel including a substantially torpedo-shaped main body portion or core which is received with clearance in the passage of the housing and whose smooth external surface defines with the internal surface of the housing an annular chamber through which the plastic material which is admitted through the inlet advances toward and issues from the outlet to form a preferably tubular parison. The mandrel also comprises several, preferably equidistant, projections which may resemble tears and extend from the external surface of the core. Each such projection is provided with a precision-finished outer face which abuts flush against the internal surface of the housing. The projections serve as a means for automatically centering the core in the housing whereby the plastic material flowing from the inlet into the aforementioned annular chamber exerts a pressure against the trailing portion of the core and urges the outer faces of the projections against the internal surface of the housing.

Figure 2:
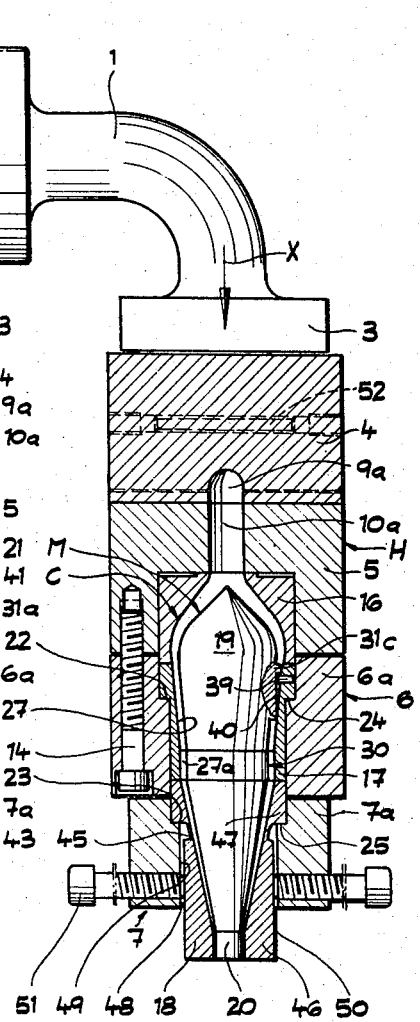

The novel features which are considered as characteristic of the invention are set forth in particular in the appended claims. The improved diehead itself, however, both as to its construction and its mode of operation, together with additional features and advantages thereof, will be best understood upon perusal of the following detailed description of a specific embodiment with reference to the accompanying drawings, in which:

FIG. 1 is a central section through the housing of a twin diehead which embodies my invention; and FIG. 2 is a section as seen in the direction of arrows from the line II—II of FIG. 1.

Referring to the drawings in detail, there is shown a portion of a suitable plasticizer P which preferably comprises a conventional screw rotatable about a horizontal axis and serving to feed a continuous stream of properly plasticized and heated synthetic thermoplastic material into the receiving end 2 of an elbow pipe 1. This pipe has a horizontal flange 3 which is bolted to the top portion or block 4 of a specially designed housing H forming part of the improved diehead. The stream of plastic material passing through the bore 8 of the pipe 1 and into a bifurcated feed conduit 9 of the block 4 is caused to change the direction of its flow by 90 degrees for reasons which need not be explained here, and the plastic material thereupon forms two streams which respectively flow through the branches 9a, 9b of the feed conduit 9. Thus, the block 4 serves as a distributor to subdivide the single stream issuing from the bore 8 of the pipe 1 into two identical streams each of which flows toward and through the lower end of the respective branch 9a, 9b. In the illustrated embodiment, the housing H forms part of a twin or dual diehead which can extrude two identical tubular parisons at a time so that this diehead can supply parisons to two blow molds in a simultaneous operation. Since the two halves of the housing H are mirror symmetrical replicas of each other, the following part of this description will deal mainly with that portion of the housing H which receives a stream of plastic material from the branch 9a and feeds it into an inlet 10a constituted by a vertical bore provided in a second block 5 of the housing H. The stream of material issuing from the branch 9b enters a second vertical inlet 10b. The improved diehead is arranged to discharge successive parisons vertically downwardly as is customary in many presently known blow molding machines.

In addition to the aforementioned blocks 4 and 5, the housing H comprises two further blocks 6 and 7. The uppermost block 4 is necessarily only when the housing H forms part of a twin or dual diehead; otherwise, the flange 3 of the pipe 1 can be bolted directly to the top face of the block 5 so that its bore 8 discharges into the inlet 10a. The flange 3 is coupled to the block 4 by means of bolts 11 or analogous fasteners. Guide pins 12 serve to properly locate the flange 3 with reference to the housing H, i.e., to make sure that the bore 8 registers very accurately with the feed conduit 9. The blocks 4–5, 5–6, and 6–7 are respectively connected to each other by bolts 13, 14, 15 or analogous fasteners.

In order to facilitate accurate machining of their internal surfaces, at least some blocks of the housing H are assembled of several portions or sections which may but need not be mirror symmetrical with reference to a central plane of the housing. In the illustrated embodiment, the two lowermost blocks 6, 7 respectively comprise portions or sections 6a, 6b and 7a, 7b. As stated before, the uppermost block 4 is necessary only when the housing H forms part of a twin diehead; however, even such twin diehead could be provided with two pipes in the form of elbows 1 or the like.

As clearly shown in the drawings, the housing H further comprises two liners each of which is composed of three superimposed annular blocks 16, 17, 18. These blocks can be said to respectively constitute part of the outer blocks 5, 6 and 7. Alternatively, the blocks 5–7 can be said to form an outer shell and the blocks 16–18 can be said to constitute two internal shells or liners of the housing H. The blocks 16–18 of FIG. 2 together define a specially configured passage or channel C which extends from the inlet 10a to an outlet 20 defined by the lowermost part of the block 18. The internal surface 27 of the liner 16–18 is precision finished to be entirely free of scratches, crevices, protuberances, and other unevenesses which could affect the flow of plastic material and hence the quality of the ultimate products. This passage or channel C accommodates with clearance the core 19 of a substantially torpedo-shaped mandrel M whose tip 28 is located immediately downstream of the inlet 10a, as seen in the direction of material flow toward the outlet 20. The precision finished external surface 30 of the core 19 defines with the internal surface 27 of the liner an annular chamber 26 through which the material flows on its way from the inlet 10a to the outlet 20. The direction of flow of plastic material is indicated by an arrow X.

The uppermost inner block 16 is secured to the associated outer block 5 by a series of vertical bolts 21 or analogous fasteners. The other two internal blocks 17, 18 are held in requisite position by the associated blocks 6, 7 without being bolted or otherwise positively connected thereto. The block 6 has an upwardly facing internal shoulder 24 which abuts against a complementary external shoulder 22 of the adjoining internal block 17. A similar internal shoulder 25 is provided in the lowermost outer block 7 to abut against a complementary external shoulder 23 of the internal block 18. The bolts 14 and 15 are driven home with such force that the abutting end faces of the blocks 16, 17, 18 are urged against each other with a pressure which suffices to prevent uncontrolled escape of plastic material. The provision of an internal liner which is composed of several blocks (16, 17, 18) constitutes an advantageous feature of my invention because such individual blocks can be machined with utmost precision and their internal surfaces can be treated to an exceptionally high degree of precision finish. As stated before, the internal surface 27 of the liner 16–18 must be very smooth and should be free of dead corners, sharp edges and like formations which could lead to accumulation and stagnation of plastic material during travel in the chamber 26.

The core 19 of the torpedo-shaped mandrel M comprises a rear portion located immediately downstream of the tip 28 and extending to an equatorial plane 29 (shown in FIG. 1). The external surface of this rear section tapers toward the inlet 10a and is surrounded by a similarly tapering portion of the internal surface 27, i.e., by that portion of the internal surface 27 which is the internal surface of the uppermost inner block 16. The next or median section of the core 19 tapers slightly in a direction toward the outlet 20 and is immediately adjacent to the aforementioned rear section. The median section is surrounded by a similarly tapering portion of the internal surface 27 constituted by the internal surface of the inner block 17. The median section of the core 19 is followed by a frustoconical lower or front section which tapers rather strongly in a direction toward the outlet 20 and is surrounded by a similarly tapering portion of the internal surface 27 constituted by the internal surface of the block 18. Save for a short intermediate zone 27a, the cross-sectional area of the entire chamber 27 preferably diminishes in a direction from the inlet 10a toward the outlet 20. The cross-sectional area of the outlet 20 can but need not be constant. This outlet 20 receives the lowermost portion of the core 19, and such lowermost portion defines with the adjoining portion of the block 18 an annular orifice which discharges tubular parisons.

The mandrel M further comprises several (for example, three) equidistant, preferably tear-shaped self-centering projections 31a, 31b, 31c which are disposed in the region immediately below the equatorial plane 29 and whose pointed ends or tips face toward the outlet 20. The outer faces 32 of the projections 31a–31c are precision finished and abut flush against the adjoining portions of the internal surface 27 so that plastic material flowing around such projections cannot penetrate between the surface 27 and the outer faces 32. The width of each outer face 32 (as seen in the circumferential direction of the core 19) is relatively small, especially when compared with the circumferential length of the core, to make sure that such projections bring about a relatively small reduction in the cross-sectional area of the chamber 26. Since the plastic material issuing from the inlet 10a and entering the adjoining end of the passage C bears against the upwardly tapering rear section of the core 19, the mandrel M is urged deeper into the passage and the projections 31a–31c perform a self-centering function which insures that the width of the chamber 26 is the same in each radial plane of the core 19. In other words, proper centering of the mandrel M can be achieved without resorting to any auxiliary centering means which would extend inwardly from the surface 27 and could adversely affect the flow of plastic material in the chamber 26. Furthermore, the outer faces 32 of the projections 31a–31c can be readily machined with utmost precision, whereas a similar precision finish of projections extending inwardly from the liner 16–18 would involve much more work and would necessitate the use of specially built machinery. The outer faces 32 are preferably ground, lapped, honed or otherwise treated so that they can be placed into full abutment with the adjoining portions of the internal surface 27. Any plastic material which would be permitted to penetrate between the internal surface 27 and one or more outer faces 32 could bring about misalignment of the mandrel M and could adversely affect the appearance and the quality of parisons.

One of the projections 31a–31c, for example, the projection 31a shown in the right-hand portion of FIG. 1, can be utilized for admission of compressed air or another suitable fluid into a composite bore 36, 37 in the core 19 of the mandrel M. Such compressed air issues from the discharge end 38 which is surrounded by the outlet 20 and is used to prevent collapse of the parison while its material is still readily deformable and while the parison is being separated from the die head and is being properly engaged by the sections of a blow mold or another suitable further processing device. The intake end 35 of the bore 36, 37 extends all the way to and registers with a small radial bore in the projection 31a. This intake end receives a hollow nozzle 34 of a fluid-admitting device in the form of a nipple 33 which is screwed into the adjoining outer block 6 and extends through the inner block 17. The exposed end of the nipple 33 can be coupled to a hose connecting to an air compressor or another source of compressed fluid. Admission of compressed fluid into the interior of a freshly extruded parison is advisable at all times, especially when the wall of the parison is relatively thin. Also, fluid issuing from the discharge end 38 of the bore 36, 37 may be used to actually expand the parison in the cavity of a blow mold.

At least one of the projections 31a–31c, for example, the projection 31c shown in FIG. 2 can be utilized to cooperate with suitable arresting means for holding the mandrel M against uncontrolled angular displacement with reference to the housing H. Such arresting means may take the form of a pin 39 which is anchored in the inner block 17 and extends radially inwardly beyond the internal surface 27 and into a vertically extending groove 40 in the outer face 32 of the projection 31c. The nozzle 34 of the fluid-admitting nipple 33 is normally very weak but the provision of the arresting pin 39 and groove 40 insures that the nozzle 34 is not subjected to excessive bending or like stresses. The arresting pin 39 does not come in contact with plastic material because the grooved outer face 32 of the projection 31c shown in FIG. 2 abuts against the internal surface 27 of the liner 16–18.

In order to facilitate the treatment of its external surface 30, the core 19 may be assembled of several portions, such as the portions 41, 42 shown in the right-hand part of FIG. 1. It will be seen that the upper portion 41 embraces the tip 28 and the aforementioned rear and median sections of the core 19. The lower portion 42 is constituted by the aforementioned front section which resembles the frustum of a core and tapers toward the outlet 20 whereby its taper is more pronounced than the taper of the median section. The portions 41, 42 of the core 19 are separably connected to each other by a threaded fastener in the form of a screw 43 anchored in the portiton 42 and extending into a tapped bore 44 of the portion 41. The screw 43 has an axially extending bore which forms part of the aforementioned bore section 37. The tapped bore 44 communicates with the section 36 of the aforementioned bore.

Whenever the passage for plastic material contains protuberances or other unevennesses which obstruct the flow of material toward the outlet, the presence of such obstructions is marked by "seams" or other flaws in the parison which issues from the orifice. Such seams affect not only the appearance but also the strength characteristics of a blow-molded article. Due to the fact that the protuberances 31a–31c of the mandrel M resemble relatively flat bodies of tear shape, and also due to the fact that the tips of such tear-shaped projections point toward the outlet 30, the improved diehead can furnish parisons which are invariably free of seams and which exhibit exceptionally satisfactory strength characteristics. The formation of seams is further prevented by such dimensioning of the inner blocks 16–18 and core 19 that the cross-sectional area of the chamber 26 diminishes at least along a portiton of the path in which the material flows from the projections 31c–31a to the outlet 20. The channel 26 diminishes very pronouncedly in the interior of the lowermost inner block 18. In other words, the parts 42 and 18 offer a certain resistance to the flow of plastic material into the outlet 20 whereby such material tends to accumulate and to fill each and every zone of the chamber 26 to thus eliminate all traces of eventual seams which might have developed due to the presence of projections 31a–31c.

In order to compensate for eventual inaccuracies in machining of the inner blocks 16–18 and/or core 19, the improved diehead is preferably provided with very simple and effective adjusting means which allows for centering of the core not only when the machine utilizing the die head is idle but also when the machine is in actual operation. Certain minor inaccuracies in machining of the components of my improved diehead are unavoidable and the provision of the just mentioned adjusting means insures that the personnel in charge can properly calibrate the diehead in actual use, i.e., after the diehead has produced one or more parisons whose wall thickness is not uniform. The lowermost inner block 18 comprises an upper annular portion 47 which is located above the shoulder 25 and a lower annular portion 46 which surrounds the lowermost part of the core 19. The lower annular portion 46 is tiltable with reference to the annular portion 47 due to the provision of a relatively thin annular web 45 which connects the annular portions 46, 47 in the region directly below the shoulder 25. The remainder of the housing H, for example, the lowermost outer block 7, carries a series of radially inwardly extending adjusting means in the form of bolts, screws or analogous threaded members 51 which can be reached at all times and which can be rotated with reference to the block 7 to thereby change the inclination of the axis of the annular portion 46 with reference to the axis of the annular portion 47 until the axis of the annular portion 46 coincides exactly with the axis of the lower portion 42 of the core 19. Of course, the web 45 may constitute a separate part which is soldered, welded, riveted or otherwise attached to the annular portions 46 and 47. The tips of stems of the adjusting screws 51 bear against the external surface 50 of the annular portion 46. The lower portion 46 of the block 18 is received in the block 7 with a small clearance shown at 48. The internal surface 49 of the block 7 and the external surface 50 of the lower annular portion 46 need not be machined to a very high degree of precision finish.

The numeral 52 denotes in FIG. 2 a conduit which extends through the block 4 and serves to allow for circulation of a heating or cooling medium which maintains the temperature of the plastic material flowing through the branches 9a, 9b of the feed conduit 9 within a predetermined optimum range.

The construction of the mandrel M and of the inner blocks 16–18 shown in the left-hand part of FIG. 1 is identical with the construction of corresponding parts shown in FIG. 2 or in the right-hand part of FIG. 1.

Subdivision of at least some outer blocks (such as the blocks 6 and 7) into two or more abutting portions or sections (6a, 6b and 7a, 7b) is advisable not only when the diehead comprises a single mandrel M but especially when the diehead accommodates two or more mandrels. Of course, the housing H can define two or more different passages C and can accommodate an equal number of differently dimensioned mandrels so that the same diehead can produce in a simultaneous operation two or more parisons each having a different diameter and/or wall thickness. The block 5 and/or 4 may but need not consist of two or more portions.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalance of the following claims.

What is claimed as new and desired to be protected by Letters Patent is:

1. For use in a machine for forming shaped articles of plastic material, a diehead comprising a housing provided with an inlet, an outlet, and a passage connecting said inlet with said outlet, said housing having an internal surface bounding said passage; and a mandrel comprising a substantially torpedo-shaped core received with clearance in said passage and having an external surface defining with said internal surface an annular chamber through which plastic material admitted through said inlet advances toward and issues from said outlet, said mandrel further comprising a plurality of self-centering projections extending from the external surface of said core and provided with outer faces abutting flush against portions of said internal surface tapering toward said outlet so that the pressure of plastic material passing from said inlet to said outlet will press said outer faces of said projections against said portions of said internal surface to maintain the axial position of said mandrel relative to said diehead and to prevent any plastic material to penetrate between said outer faces and said internal surface portions so as to maintain perfect centering of said mandrel in said passage of said housing.

2. A diehead as set forth in claim 1, wherein said core comprises a tip located at the upstream end of said passage as seen in the direction of material flow, a rear section tapering in a direction toward said tip, a median section located downstream of said rear section and tapering toward said outlet, and a front section located downstream of said median section and also tapering toward said outlet, the taper of said front section being more pronounced than the taper of said median section and said internal surface having rear, median, and front portions respectively surrounding and tapering in the same direction as said rear, median and front sections.

3. A diehead as set forth in claim 1, wherein the cross-sectional area of said chamber diminishes in a direction from said inlet toward said outlet, at least along that portion of said passage which is nearer to said outlet.

4. A diehead as set forth in claim 1, wherein each of said projections resembles a tear and comprises a tip facing toward said outlet.

5. A diehead as set forth in claim 1, wherein said core is provided with a fluid-conveying bore having a discharge end surrounded by said outlet and an intake end adjacent to one of said projections, and further comprising fluid-admitting means secured to said housing and extending through said one projection to communicate with said intake end.

6. A diehead as set forth in claim 1, further comprising arresting means for holding said mandrel against rotation, said arresting means comprising at least one pin secured to said housing and extending inwardly from said internal surface, one of said projections having a groove which receives said pin to thereby hold the mandrel against rotation in said passage.

7. A diehead as set forth in claim 1, wherein said housing comprises a plurality of abutting annular blocks each surrounding a portion of said passage.

8. A diehead as set forth in claim 7, wherein said housing comprises three annular blocks and said core comprises a tip located at the upstream end of said passage as seen in the direction of material flow, a rear section tapering in a direction toward said tip and surrounded with clearance by the first of said three blocks, a median section located downstream of said rear section and tapering toward said outlet, and a front section located downstream of said median section and also tapering toward said outlet, the taper of said front section being more pronounced than the taper of said median section and said internal surface having rear, median and front portions respectively surrounding and tapering in the same direction as said rear, median and front sections, the second and third blocks of said housing respectively surrounding with clearance said median and front sections of the core.

9. A diehead as set forth in claim 7, further comprising fastener means separably coupling said blocks to each other.

10. A diehead as set forth in claim 1, wherein said housing comprises an annular block surrounding said core in the region of said outlet, said block having a first annular portion rigid with the remainder of said housing and a second annular portion nearer to said outlet, said second annular portion being tiltable with reference to said first annular portion, and further comprising adjusting means carried by the remainder of said housing for tilting said second annular portion to thereby regulate the shape of that portion of said annular chamber which extends between said second annular portion and the respective portion of said core.

11. A diehead as set forth in claim 10, wherein said adjusting means comprises a plurality of threaded members extending substantially radially of said second annular portion and rotatable with reference to the remainder of said housing to thereby change the inclination of the axis of said second annular portion with reference to said first annular portion.

12. A diehead as set forth in claim 10, wherein said annular block further comprises a relatively thin annular web connecting said first and second annular portions thereof.

13. A diehead as set forth in claim 1, wherein said inlet is coaxial with said passage.

14. A diehead as set forth in claim 1, wherein said housing comprises a plurality of adjoining outer annular blocks each surrounding a portion of said passage and wherein at least one of said blocks comprises two substantially mirror symmetrical halves.

15. A diehead as set forth in claim 1, wherein said housing is provided with a second inlet, a second outlet and a second passage connecting said second inlet with said second outlet, and further comprising a second mandrel provided in said second passage to define with said housing a second annular chamber, said housing further having a feed conduit to supply plastic material to said inlets.

16. A diehead as set forth in claim 15, wherein said housing comprises two sets of abutting annular blocks, one set for each of said passages, the blocks of each set surrounding adjoining portions of the respective passages and at least some blocks of each set comprising a plurality of abutting portions.

17. A diehead as set forth in claim 1, wherein said core comprises an extension received with clearance into said outlet so that the material issuing from said outlet constitutes a tubular parison which can be introduced into a blow mold.

18. A diehead as set forth in claim 1, wherein the cross-sectional area of said chamber diminishes gradually in the region immediately upstream of said outlet and wherein said inlet is coaxial with said chamber and with said outlet.

19. A diehead as set forth in claim 1, wherein said core comprises a plurality of separable portions.

20. A diehead as set forth in claim 1, wherein said housing comprises an outer shell and an internal liner surrounding said passage, said liner comprising a plurality of abutting annular blocks.

References Cited

UNITED STATES PATENTS

| | | | |
|---|---|---|---|
| 2,859,476 | 11/1958 | Lainson | 18—14 X |
| 2,913,763 | 11/1959 | Longstreth et al. | 18—14 |
| 2,952,871 | 9/1960 | Loeser | 18—14 X |
| 3,241,346 | 3/1966 | Doss | 18—14 X |
| 3,234,597 | 2/1966 | Van Peborgh | 18—14 X |
| 3,311,952 | 4/1967 | Kovach et al. | 18—14 |
| 3,340,569 | 9/1967 | Hagen | 18—5 |

WILBUR L. McBAY, *Primary Examiner.*